United States Patent [19]

Ewen

[11] Patent Number: 4,975,403
[45] Date of Patent: * Dec. 4, 1990

[54] CATALYST SYSTEMS FOR PRODUCING POLYOLEFINS HAVING A BROAD MOLECULAR WEIGHT DISTRIBUTION

[75] Inventor: John A. Ewen, Houston, Tex.

[73] Assignee: Fina Technology, Inc., Dallas, Tex.

[*] Notice: The portion of the term of this patent subsequent to Dec. 27, 2005 has been disclaimed.

[21] Appl. No.: 282,984

[22] Filed: Dec. 2, 1988

Related U.S. Application Data

[63] Continuation of Ser. No. 95,755, Sep. 11, 1987, abandoned.

[51] Int. Cl.$^5$ .............................................. C08F 4/646
[52] U.S. Cl. .................................... 502/113; 502/117; 526/114
[58] Field of Search ............................... 502/113, 117

[56] References Cited

U.S. PATENT DOCUMENTS

| | | | |
|---|---|---|---|
| 4,411,821 | 10/1983 | Howard | 502/117 |
| 4,497,906 | 2/1985 | Hanji et al. | 502/117 X |
| 4,522,982 | 6/1985 | Ewen | 525/240 |
| 4,530,914 | 7/1985 | Ewen et al. | 502/113 |
| 4,542,199 | 9/1985 | Kaminsky et al. | 502/117 X |
| 4,658,078 | 4/1987 | Slaugh et al. | 502/117 X |
| 4,794,096 | 12/1988 | Ewen | 502/117 |

FOREIGN PATENT DOCUMENTS

| | | |
|---|---|---|
| 0128045 | 12/1984 | European Pat. Off. . |
| 0128046 | 12/1984 | European Pat. Off. . |
| 0129368 | 12/1984 | European Pat. Off. . |
| 0185918 | 7/1986 | European Pat. Off. ............ 502/117 |
| 0197319 | 10/1986 | European Pat. Off. . |
| WO87/0299 | 5/1987 | PCT Int'l Appl. . |
| WO87/03604 | 6/1987 | PCT Int'l Appl. . |

OTHER PUBLICATIONS

Chem. Ab., vol. 106, 138888j (1987).
Ewen, J.A.C.S., vol. 106, No. 21, pp. 6355–6464 (1954).
John A. Ewen, "Ligand Effects on Metallocene Catalyzed Ziegler-Natta Polymerizations", published by Elsevier Publishing Co., Apr. 25, 1986.
Basel, "Olefin Polymerization with Highly Active Soluble Zirconium Compounds Using Aluminoxane as Co-Catalyst", Die Makromolekulare Chemie/Macromolecular Symposia, Jun. 3, 1986, Switzerland, pp. 377–387.
Kaminsky, "Stereoselektive Polymerization von Olefinen mit Homogenen, Chiralen Ziegler-Natta-Katalysatoren", 145/146, 1986, pp. 149–160.

Primary Examiner—Patrick P. Garvin
Attorney, Agent, or Firm—Jim D. Wheelington; John K. Abokhair; M. Norwood Cheairs

[57] ABSTRACT

The invention provides catalyst systems for use in the polymerization of olefins to produce a polymer product having a broad molecular weight distribution. The catalyst system includes at least two different chiral, stereorigid metallocene catalysts of the formula $R''(C_5(R')_4)_2MeQ_p$ and an aluminum compound, preferably an alumoxane. These catalyst systems are especially useful in the polymerization of propylene.

10 Claims, 6 Drawing Sheets

CATALYST SYSTEMS FOR PRODUCING POLYOLEFINS HAVING A BROAD MOLECULAR WEIGHT DISTRIBUTION

This application is a continuation of application Ser. No. 95,755 filed Sept. 11, 1987 and now abandoned.

TECHNICAL FIELD

The invention relates to catalyst systems for the polymerization of olefins that produce a polymer product having a broad molecular weight distribution. These catalyst systems include at least two different chiral, stereo-rigid metallocene catalysts and an aluminum compound.

BACKGROUND

The present invention provides catalyst systems for use in the polymerization of olefins, especially propylene and copolymers of propylene, that produce a polymer with a broad or multimodal molecular weight distribution. These catalyst systems include a mixture of at least two different chiral, stereo-rigid metallocene catalysts.

The use of metallocene catalysts in the polymerization of olefins is known in the art. German Patent Application No. 2,608,863 discloses a catalyst system for the polymerization of ethylene which system consists of a bis(cyclopentadienyl) titanium dialkyl, an aluminum trialkyl and water. Similarly, German Patent Application No. 2,608,933 discloses a zirconium metallocene of the formula (cyclopentadienyl)$_n$ZrY$_{4-n}$, wherein Y represents R, CH$_2$AlR$_2$, CH$_2$CH$_2$AlR$_2$, or CH$_2$CH(AlR$_2$)$_2$ and where R is an alkyl or metallo alkyl and n is an integer within the range 1–4. This catalyst is described as being useful in the polymerization of ethylene.

Metallocene catalysts are known to be useful in the copolymerization of ethylene and other alphaolefins. U.S. Pat. No. 4,542,199 to Kaminsky, et al. discloses a catalyst system that comprises a catalyst of the formula (cyclopentadienyl)$_2$MeRHal, in which R is a halogen, a cyclopentadienyl group, or a C$_1$–C$_6$ alkyl radical; Me is a transition metal, in particular zirconium, and Hal is a halogen, in particular chlorine. The catalyst system also includes an alumoxane of the formula Al$_2$OR$_4$(Al(R)—O)$_n$ for a linear molecule and/or (Al(R)—O)$_{n+2}$ for a cyclical molecule in which n is a number from 4–20 and R is a methyl or ethyl radical. A similar catalyst system is disclosed in U.S. Pat. No. 4,404,344.

Metallocene catalysts particularly useful in the polymerization of propylene and higher alpha-olefins are disclosed in European Patent Publication No. 0185918. This Publication discloses a zirconium metallocene catalyst that includes a bridge between two cyclopentadienyl rings. The bridge is described as being a linear hydrocarbon with 1–4 carbon atoms or a cyclical hydrocarbon with 314 6 carbon atoms.

Other metallocene catalysts are also disclosed in copending U.S. applications Ser. Nos. 034,341 (now abandoned) and 034,472 (now abandoned) both of which are inventions by the present inventor and are assigned to the same assignee. Application Ser. No. 034,472 (now abandoned) describes a method for varying the melting points and molecular weights of polyolefins by varying the bridge and other substituents on a metallocene catalyst. Application Ser. No. 034,341 (now abandoned) discloses a catalyst system comprising a stereo-rigid hafnium metallocene catalyst in combination with an aluminum compound. The catalyst is described by the formula R"(C$_5$R'$_m$)$_2$-HfQ$_p$ wherein R" includes a bridge between the two (C$_5$R'm) rings. These hafnium metallocene catalysts are more stereo-specific and produce polymers with higher molecular weights than previously obtainable with metallocene catalysts.

The metallocene catalyst systems described above typically produce a polymer product with a relatively narrow molecular weight distribution (MWD). This distribution, as defined by Mw/Mn, is usually within the range of 2–4. For some polymer applications, it is desirable to have a narrow MWD; for others, a broad MWD is desirable.

U.S. Pat. No. 4,530,914 discloses a catalyst system for the polymerization of ethylene to polyethylene having a broad MWD which may be bimodal or multimodal. The catalyst system comprises at least two different metallocenes that have different rate constants for the propagation and termination of ethylene polymerizations. The disclosure is limited to the production of ethylene, and the disclosed catalyst system does not address the stereochemical problems of making useful polypropylene and other higher alpha-olefins.

The present invention provides a catalyst system that may be used to polymerize almost all olefins, and not just ethylene, and to produce a polymer product with a broad MWD. The MWD may be tailored to a desired level by varying the substituents of the catalyst system.

SUMMARY OF THE INVENTION

The present invention provides catalyst systems for the polymerization of olefins that produce polymers with a broad or multimodal molecular weight distribution. The invention further provides a process for polymerizing olefins in the presence of the catalyst system such that the polymer product has a broad molecular weight distribution. The invention is useful in the polymerization of all olefins, but is particularly useful in the polymerization of propylene and copolymers of propylene and other olefins.

The catalyst system of the present invention comprises at least two different metallocene catalysts which are chiral and stereo-rigid in combination with an aluminum compound. The metallocene catalysts can be described by the formula:

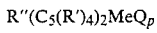

R"(C$_5$(R')$_4$)$_2$MeQ$_p$ wherein (C$_5$(R')$_4$) is a cyclopentadienyl or substituted cyclopentadienyl ring; each R' may be the same or each may be different, and R' is a hydrogen or a hydrocarbyl radical having 1–20 carbon atoms; R" is an organic or inorganic group that acts as a bridge between the two (C$_5$(R')$_4$) rings and serves to make the catalyst stereorigid; Me is a Group 4b, 5b, or 6b metal of the Periodic Table; Q is a hydrocarbon radical having 1–20 carbon atoms or is a halogen; and 0≦p≦3. The catalysts may differ by having different metals as the Me group or by having different groups for any of the ligands or substituent groups. By varying the catalyst combinations, it is possible to make polymer products with varying molecular weight distributions.

The catalyst system also includes an aluminum compound which is preferably an alumoxane. The alumoxane can be either linear, cyclic, or a combination of linear and cyclic. In another embodiment of the invention, the aluminum compound may include a mixture of alumoxane and trimethyl aluminum. In addition, a solvent may also be added to the system. Preferred solvents include toluene, xylene and methylene chloride.

The present invention further provides a process for the polymerization or copolymerization of olefins and producing a polymer having a broad molecular weight distribution. The process comprises polymerizing a monoolefin, particularly propylene, or copolymerizing two or more olefins in the presence of a catalyst system as described. Again, it is possible to tailor the molecular weight distribution of a polymer by selecting the appropriate combination of metallocene catalysts. The invention further provides a polyolefin with a relatively broad molecular weight distribution that is made by this process.

BRIEF DESCRIPTION OF THE FIGURES

The foregoing and additional objects and advantages of the invention will be more apparent when the following detailed description is read in conjunction with the accompanying Figures.

FIG. 3 shows the high and broad MWD obtained by practicing the present invention.

DETAILED DESCRIPTION

Figure 1:
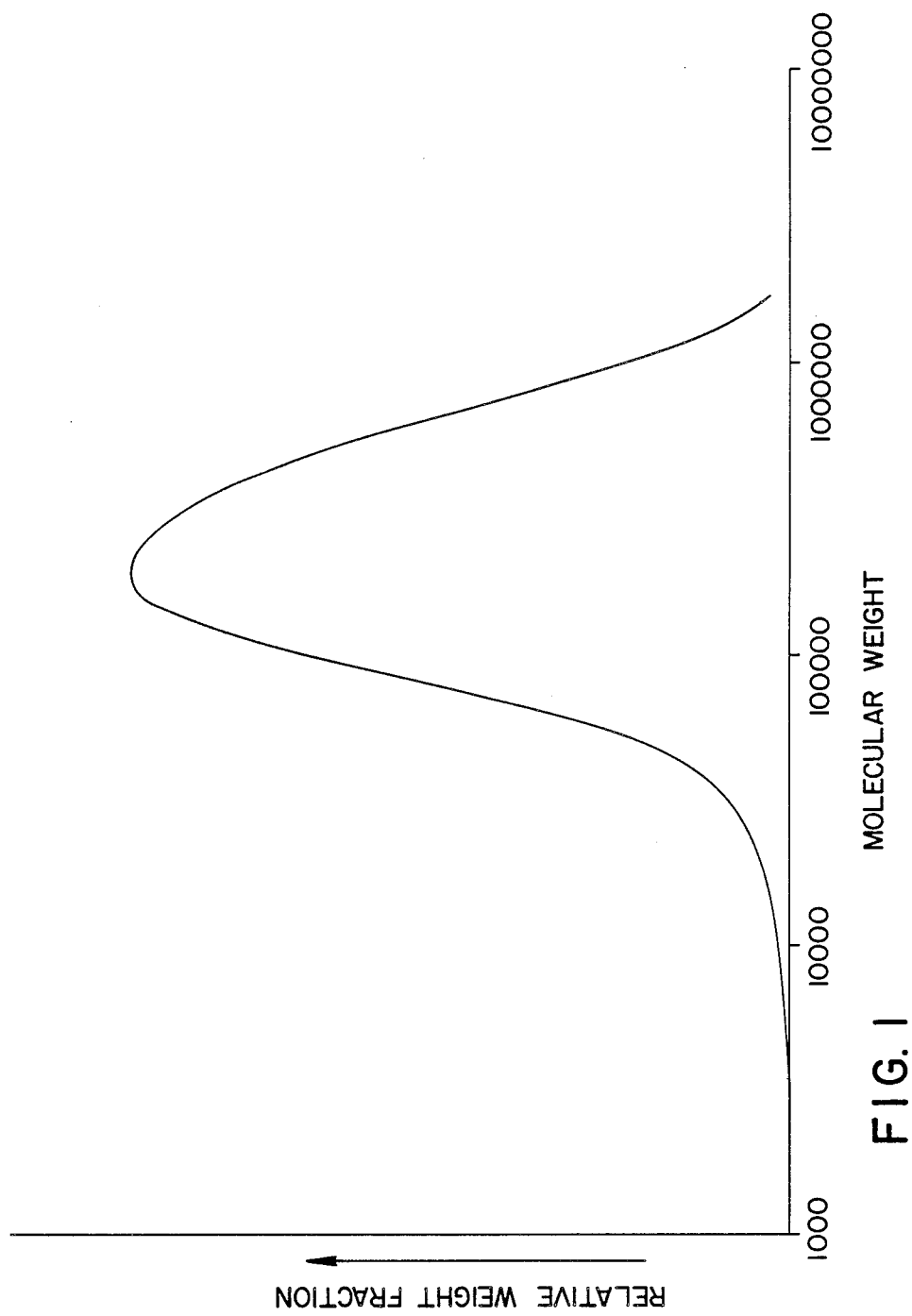
FIG. 1 is a plot of the molecular weight distribution ("MWD") as derived from a GPC elution curve for the polypropylene produced in comparative Example A. It shows the high and narrow MWD obtained from using Et(Ind)$_2$HfCl$_2$ in a single catalyst system.

The present invention provides catalyst systems for use in the polymerization of olefins to obtain a polymer with a broad or multimodal molecular weight distribution (MWD). The invention is particularly applicable to the polymerization of propylene because of the stereochemical control that the catalyst systems exhibit on the polymer and the systems ability to produce a polymer with a high isotactic index The catalyst systems of the present invention, however, may be used to polymerize higher olefins as well as ethylene and copolymers of propylene and ethylene.

The catalyst systems of the present invention comprise at least two different metallocene catalysts which are chiral and stereo-rigid in combination with an aluminum compound. The metallocene catalysts may be described by the formula:

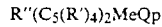

wherein (C$_5$(R')$_4$) is a cyclopentadienyl or substituted cyclopentadienyl ring; R' is a hydrogen or a hydrocarbyl radical having 1-20 carbon atoms, and each R' may be the same or each may be different; R'' connects the two (C$_5$(R')$_4$) rings such that at least a portion of R'' acts as a bridge between the two rings and makes the catalyst stereo-rigid; Me is a Group 4b, 5b, or 6b metal of the Periodic Table; Q is a halogen or is a hydrocarbyl radical having 1-20 carbon atoms; and $0 \leq p \leq 3$.

R' may be hydrogen or a hydrocarbyl radical. Examples of hydrocarbyl radicals useful as R' include alkyl, alkenyl, aryl, alkylaryl or arylalkyl radicals. More specifically, exemplary hydrocarbyl radicals include methyl, ethyl, propyl, butyl, amyl, isoamyl, hexyl, isobutyl, heptyl, octyl, nonyl, decyl, cetyl, phenyl, methylene, ethylene, propylene, and other like groups. In a preferred embodiment, the R's are selected so that (C$_5$(R')$_4$) is an indenyl radical (Ind) or a hydrated indenyl radical (IndH$_4$).

R'' is a stable component that bridges the two (C$_5$(R')$_4$) rings in order to render the catalyst stereo-rigid. R'' may be organic or inorganic and may include groups depending from the portion acting as the bridge. Examples of R'' include an alkylene radical having 1-4 carbon atoms, a silicon hydrocarbyl group, a germanium hydrocarbyl group, an alkyl phosphine, an alkyl amine, boron, nitrogen, sulfur, phosphorus, aluminum or groups containing these elements. The preferred R'' components are methylene (—CH$_2$—), ethylene (—C$_2$H$_4$—), an alkyl silicon, and a cycloalkyl silicon such as cyclopropyl silicon, among others.

Similarly, Q may be any of the hydrocarbyl groups listed for R' above, but preferably, Q is a halogen, and most preferably, Q is chlorine. Also in the preferred embodiment, p is 2.

The metallocene catalyst should be chiral, i.e., nonsuperimposable on its mirror image, for the polymerization of propylene and higher alpha-olefins in order to produce a useful polymer product. It was discovered that chirality in a metallocene catalyst exhibits stereochemical control over the polymer product and produces a polymer with a high isotactic index. In addition, the catalyst should be stereo-rigid to aid in the stereochemical control of the polymerization. It is not necessary for the catalyst to be chiral or stereo-rigid for the polymerization of ethylene or predominantly ethylene copolymers.

The present invention comprises the use of at least two different metallocene catalysts. The catalysts may differ in any one or more of the constituent groups: R'', R'$_m$, Me, or Q$_p$. The appropriate groups may be varied and the catalyst system tailored to produce a polymer product with the desired MWD. As shown in the Examples below, the combination of some catalysts produce a high and broad MWD, while other combinations produce a lower MWD. Varying the Me groups between hafnium, zirconium and titanium produces a particularly broad MWD.

The catalyst systems of the present invention also include an aluminum compound in combination with the metallocene catalysts. Preferably, the aluminum compound is an alumoxane represented by the general formula (R—Al—O) for the cyclic form and R(R—Al—O—)$_n$-AlR$_2$ for the linear form. R is an alkyl group with preferably 1-5 carbons and n is an integer preferably from 1 to about 20. Most preferably, R is a methyl group. In a preferred embodiment, the aluminum compound may be a mixture of the linear and cyclic alumoxanes. Generally, in preparing alumoxanes a mixture of the cyclic and linear forms is obtained.

The alumoxanes may be prepared using any of the methods known in the art. Preferably, they are prepared by contacting water with a solution of trialkyl aluminum, such as, for example, trimethyl aluminum in a suitable solvent such as benzene. Most preferably, the alumoxane is prepared in the presence of a hydrated copper sulfate as described in U.S. Pat. No. 4,404,344, the disclosure of which is hereby incorporated by reference. As an example, this method of preparation comprises treating a dilute solution of trimethyl aluminum in toluene with copper sulfate represented by the formula $CuSO_4.5H_2O$.

The aluminum compound of the present invention may also comprise trimethyl aluminum or a mixture of trimethyl aluminum (TMA) and alumoxane. As described in copending application Ser. No. 034,341 filed on Apr. 3, 1987, the addition of TMA with alumoxanes to the catalyst system causes a transformation of the catalyst over time with the transformed catalyst producing a product with different characteristics than the product of the initial catalyst system. Preferably, TMA is added in the amount of about 0–20 mole percent of the aluminum compound.

The catalyst system may also include a solvent to increase the solubility of the catalyst in the monomer. In a preferred embodiment, the olefin monomer is used in a liquid form. The solvent may be premixed with the catalyst or added with the monomer. The preferred solvents include toluene, xylene, and methylene chloride as well as other known solvents. Depending on the catalysts, a particular solvent may be more compatible with a particular catalyst than other solvents.

The metallocene catalysts useful in the present invention may be prepared by any of the methods known in the art. Typically, the procedures comprise the addition of a MeQ group and a R'' group to a starting compound such as indene or another dicyclopentadiene compound. An example of a preferred preparation method is given below.

The catalyst system of the present invention may be used with any polymerization process. An example of a preferred procedure is described in co-pending application Ser. No. 009,712, filed on Feb. 2, 1987 and now U.S. Pat. No. 4,767,735, the disclosure of which is hereby incorporated by reference. This process includes a pre-polymerization of the catalyst before introducing the catalyst into a polymerization reaction zone. Another preferred procedure is described in the examples below.

The following Examples illustrate the present invention and its various advantages in more detail. Included as Examples A–D are comparative examples using only one metallocene catalyst in the system. Examples 1–7 illustrate the present invention by using catalyst systems with at least two different metallocene catalysts. The results are shown in Table 1 and FIGS. 1–6.

EXAMPLE A

Preparation of a Metallocene Catalyst

A hafnium metallocene of the formula $Et(Ind)_2HfCl_2$ was prepared by first preparing the ligand $Et(Ind)_2$. The ligand was prepared by adding 215 mmol of n-butyl lithium to 215 mmol of Gold Label indene (Aldrich) in 250 ml of dry, deoxygenated tetrahydrafuran (THF) under nitrogen at −91° C. The reaction flask was warmed to 25° C. and stirred for 4 hours before 107 mmol of $1,2-C_2H_4Br_2$ dissolved in 100 ml of THF were added to the indene anion under nitrogen at −91° C. The mixture was stirred at 50° C. for 12 hours. Then, 20 ml of water were added dropwise and the ether evaporated to yield 16.4 grams (60%) of pale yellow solids.

Twenty-four cc of 1.6 M n-butyl lithium were added to 5 grams of $Et(Ind)_2$ in 150 cc of tetrahydrofuran (THF) under a nitrogen atmosphere and at liquid nitrogen/heptane slush bath temperatures. The solution became orange-red after being held at 50° C. overnight. Thereafter, 6.21 grams (19.4 mmol) of $HfCl_4$ and 250 cc of THF were cooled separately under nitrogen in liquid nitrogen/heptane slush baths. The THF was added dropwise to the $HfCl_4$ and the solution gradually warmed to 50° C. to form a transparent, colorless solution. The warm THF solution of $Et(Ind)_2Li_2$ was added by cannulation to the $HfCl_4/THF$ solution at 50° C.; whereupon it became, sequentially, yellow and then orange-red. The mixture was held overnight at 50° C. Sparging the reaction mixture for a few seconds with gaseous HCl resulted in a bright yellow solution. The solvent was removed under vacuum and the remaining yellow, viscous mass was vacuum dried to an orange cake overnight. The cake was pulverized and covered briefly with 80 cc of $CH_2Cl_2$. Decantation of the dark brown solution containing the surface impurities left 8 grams (dry weight) of a bright yellow powder. The yellow powder was dissolved in 100 cc of $CH_2Cl_2$ and the insoluble white LiCl filtered off. On addition of 1000 cc of cold pentane to the $CH_2Cl_2$ solution, 2 grams (dry weight) of a bright yellow powder precipitated. The complex was filtered off, dried and further purified by fractional recrystallization from dry toluene at 0° C. The complexes were stored under argon and were recrystallized less than 3 weeks prior to a polymerization test.

Polymerization of Propylene

In a 75 ml stainless steel sample cylinder filled with argon, a catalyst solution containing 3.4 mg of $Et(Ind)_2HfCl_2$ and toluene was precontacted for 5 minutes with a 10 ml toluene solution of 560 mg of alumoxane. The contents of the sample cylinder were then charged to a 4 liter Zipperclave reactor containing one liter of propylene and about 1 liter of toluene with the reactor at 50° C. The temperature was maintained at the reaction temperature of 50° C. and the contents of the reactor were agitated for one hour. The propylene was then vented and the contents of the reactor were washed with 50% methanol in dilute HCl solution and dried in vacuo.

Analysis of Polymer

The polymer product was then analyzed for the melting points and molecular weights. The melting points (Tm) shown in Table 1 were derived from DSC (Differential Scanning Calorimetry) data as known in the art. The melting points are not true equilibrium melting points but are DSC peak temperatures. True equilibrium melting points obtained over a period of several hours would be higher than the DSC peak melting points.

The molecular weights of the polymers were calculated using GPC (Gel Permeation Chromatography) analysis. The analysis was done on a Waters 150° C. instrument with a column of Jordi gel. The solvent was trichlorobenzene and the operating temperature was 140° C. The values for $M_n$, $M_v$, $M_z$, $M_w$ and $M_w/M_n$ are reported in Table 1.

EXAMPLES B-D

Figure 2:
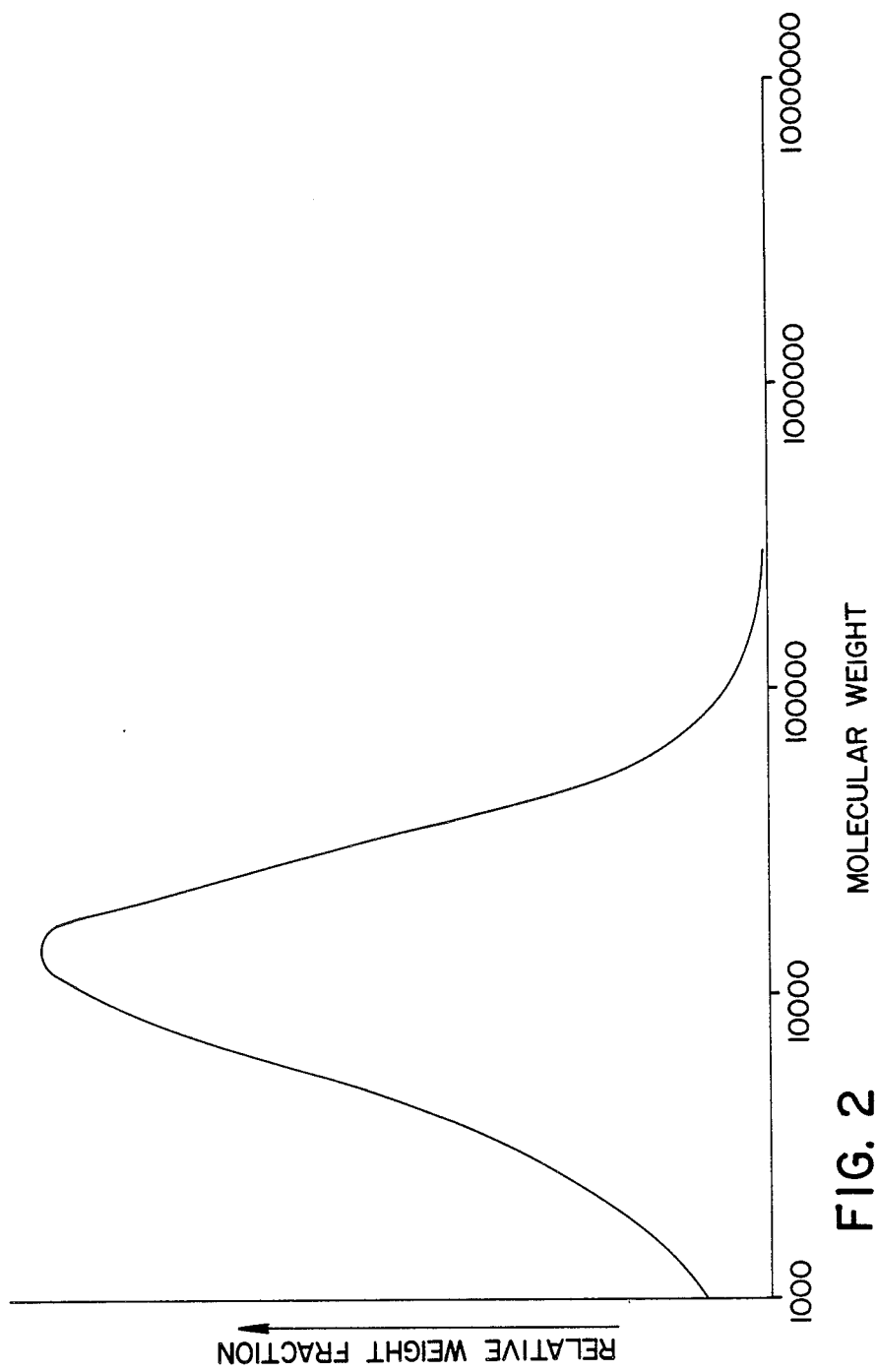
FIG. 2 is a plot of the MWD of the polypropylene produced in comparative Example D showing the narrow MWD obtained from using Et(IndH$_4$)$_2$ZrCl$_2$.

Procedures similar to Example A were followed in preparing three different metallocene catalysts: Et-(IndH$_4$)$_2$HfCl$_2$ (Example B); Et(Ind)$_2$ZrCl$_2$ (Example C); and Et(IndH$_4$)$_2$ZrCl$_2$ (Example D). Propylene was polymerized as in Example A using each of these individual catalysts under the varying conditions as given in Table 1. Table 1 also shows the MWD obtained with these individual catalysts. In particular, the $M_w/M_n$ values obtained with the single catalyst systems are all between 2.0–2.5, indicating a narrow MWD. FIGS. 1 and 2 show a plot of the GPC elution curves for Examples A and D respectively. FIG. 1 shows a high, narrow MWD while FIG. 2 exhibits a lower MWD.

EXAMPLE 1

Two metallocene catalysts prepared as in Examples A and D were used together in the polymerization of propylene. The catalysts, Et(Ind)$_2$HfCl$_2$ and Et-(IndH$_4$)$_2$ZrCl$_2$, were used in the amounts reflected in Table 1 and were precontacted with 700 mg of alumoxane in toluene as in Example A. The reaction temperature was 45° C.

Figure 3:
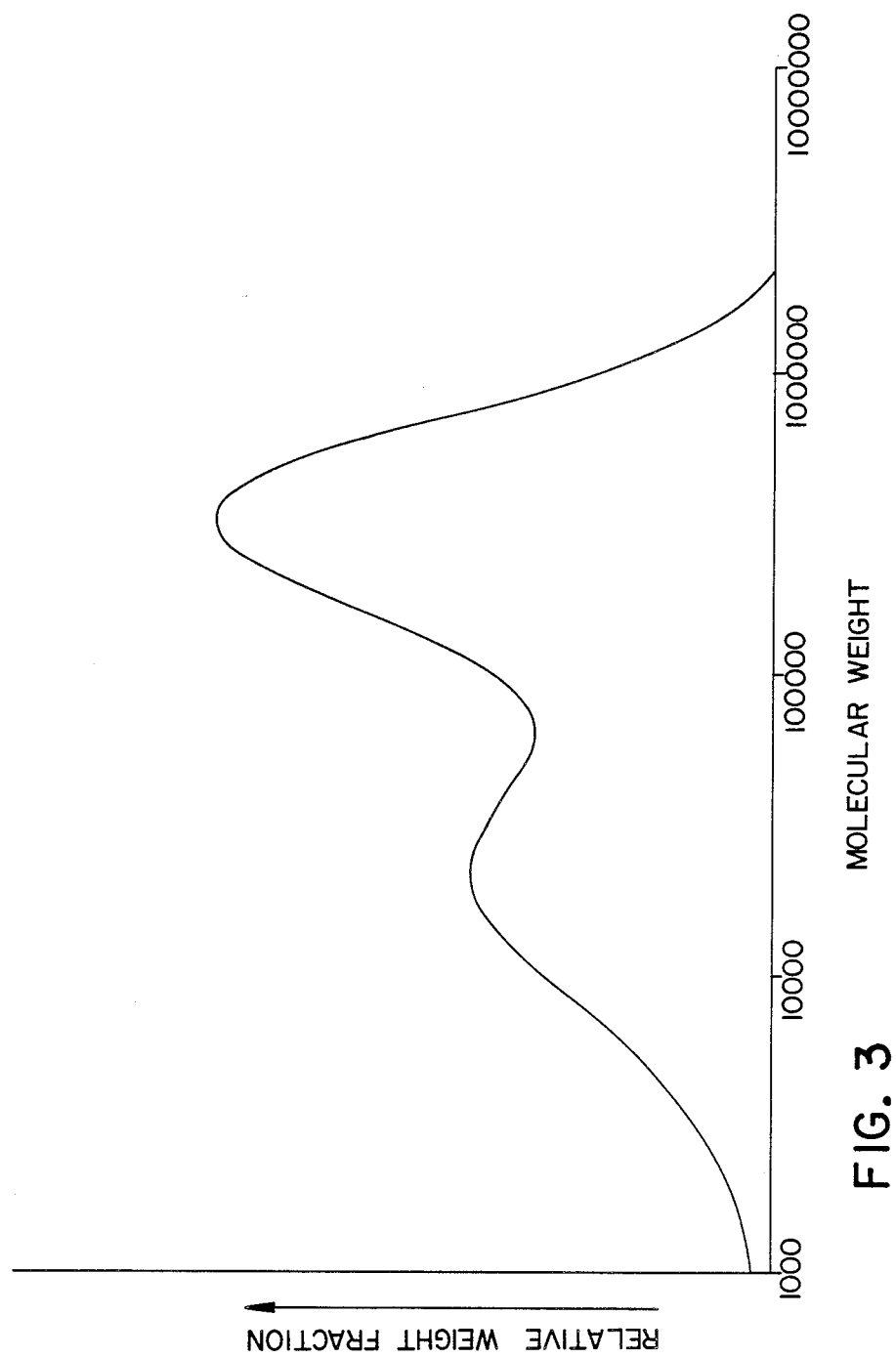
FIG. 3 is a plot of the MWD of the polypropylene produced in Example 1 in accordance with the present invention. In Example 1, propylene was polymerized using a catalyst system comprising two metallocene catalysts: Et(Ind)$_2$HfCl$_2$ and Et(IndH$_4$)$_2$ZrCl$_2$.
Figure 4:
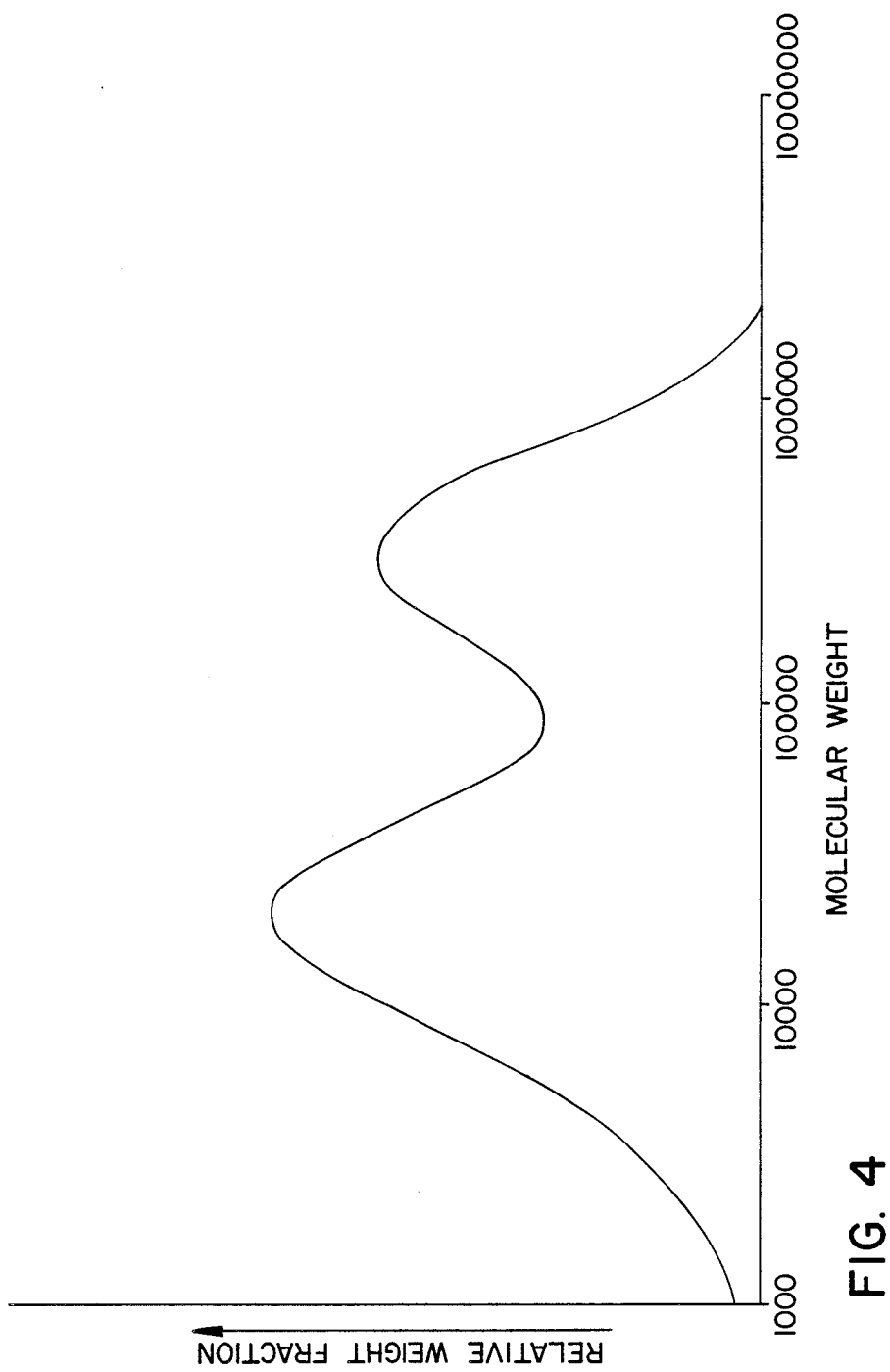
FIG. 4 is a plot of the MWD for the polymer product of Example 2.
Figure 5:
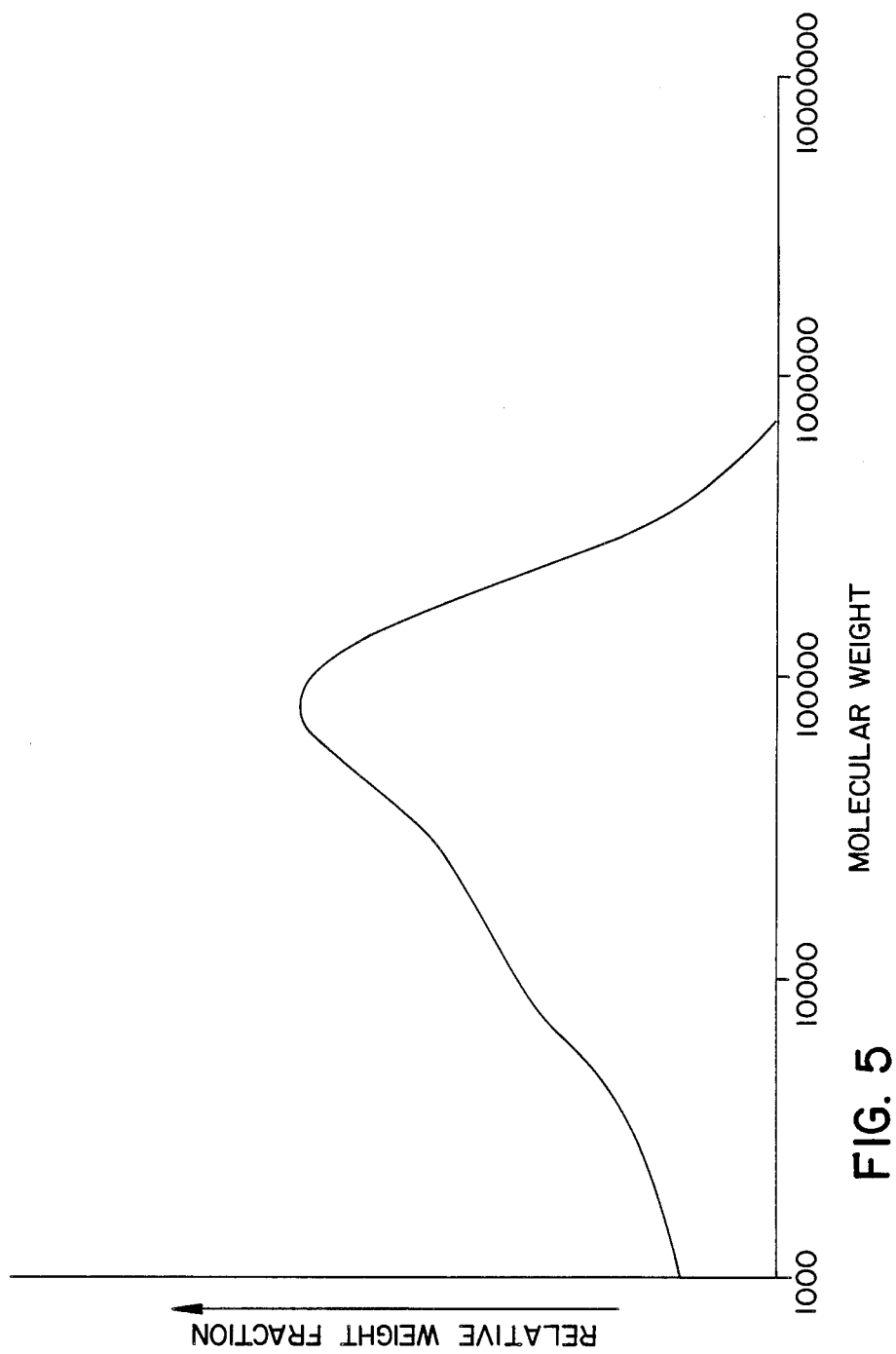
FIG. 5 is a plot of the MWD for the polypropylene produced in Example 4.
Figure 6:
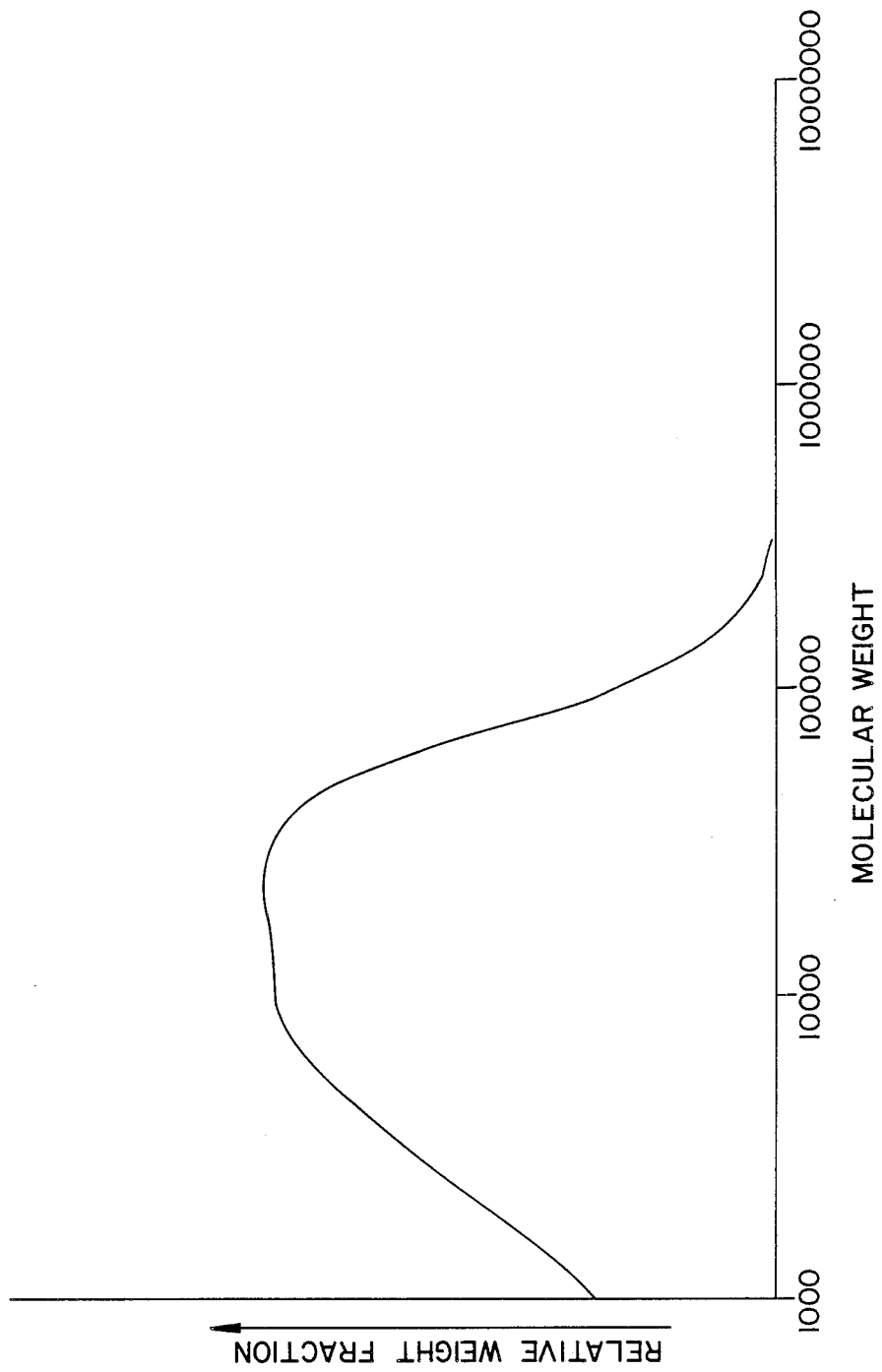
FIG. 6 is a plot of the MWD for the polypropylene produced in Example 7. This plot shows a broad distribution at a lower molecular weight than the other figures.

The polymer product exhibited a very broad MWD with $M_w/M_n=9.9$. The plot of the MWD is shown in FIG. 3. The use of the two metallocene catalysts as taught by the present invention caused a dramatic change in the MWD as compared to either of the single catalyst systems as shown in FIGS. 1 or 2.

EXAMPLES 2-7

Similar to Example 1, Examples 2-7 used two different metallocene catalysts as indicated in Table 1 and under the polymerization conditions shown in Table 1. The MWD for Examples 2, 4, and 7 are plotted in FIGS. 4, 5, and 6 respectively. These results show an ability to vary the breadth and the values of the MWD by using different combinations of various metallocene catalysts as described by the present invention.

The Examples illustrate the present invention with Hf and Zr metallocene catalysts. Other transition metals are also useful in the present invention. The amounts of the catalysts may be varied to achieve different MWD. Similarly, different polymerization procedures may be used as well as different conditions, such as temperature and the addition of a solvent, to achieve different results.

Having described only a few embodiments of the present invention, it will be apparent to one having skill in the art that various modifications, variations, and adaptations may be made without departing from the scope of the present invention.

I claim:

1. A catalyst system for the polymerization and copolymerization of olefins having 3-8 carbon atoms, said system comprising:
   (a) at least two different metallocene catalysts which are chiral and stereo-rigid and are described by the formula:

$$R''(C_5(R')_4)_2MeQ_p$$

wherein (C$_5$(R')$_4$) is a cyclopentadienyl or substituted cyclopentadienyl ring; each R' is the same or different and is a hydrogen or hydrocarbyl radical having 1–20 carbon atoms; R'' is a structural bridge between the two (C$_5$(R')$_4$) rings imparting stereo-rigidity to said catalyst, and R'' is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal as designated in the Periodic Table of Elements; each Q is a hydrocarbyl radical having 1–20 carbon atoms or is a halogen; $0 \leq p \leq 3$; and in at least one of said metallocene catalyst Me is hafnium; and
   (b) an organoaluminum compound selected from the group consisting of alumoxane, trimethyl aluminum, and mixtures thereof.

2. The catalyst system of claim 1, wherein Me is hafnium, zirconium or titanium.

3. The catalyst system of claim 1, wherein the system contains at least one zirconocene catalyst.

4. The catalyst system of claim 1, wherein R' is selected such that the group (C$_5$(R')$_4$) in at least one of said catalysts is an indenyl radical or a hydrated indenyl radical.

5. The catalyst system of claim 1, wherein R'' is an ethylene radical in at least one of said catalysts.

6. The catalyst system of claim 1, further comprising:
   (c) a solvent that increases the solubility of the catalyst in an olefin monomer.

7. The catalyst system of claim 6, wherein said solvent is selected from the group consisting of toluene, xylene, and methylene chloride.

8. The catalyst system of claim 1, wherein said organoaluminum compound is a mixture of alumoxane and trimethyl aluminum.

9. The catalyst system of claim 1, wherein the system exhibits a transformation over time in polymerizing olefins such that it produces over time a polymer product having different characteristics than the product initially produced by the system.

TABLE 1

| Ex. | Hf Catalyst | Zr Catalyst | Hf mg | Zr mg | Alumoxane mg | Toluene l | T °C. | Yield g | Tm °C. | $M_n$/ 1000 | $M_v$/ 1000 | $M_w$/ 1000 | $M_z$/ 1000 | $M_w/M_n$ |
|---|---|---|---|---|---|---|---|---|---|---|---|---|---|---|
| A | Et(Ind)$_2$ HfCl$_2$ | | 3.4 | | 560 | 1.0 | 50 | 230.0 | 134 | 130 | 277 | 304 | 538 | 2.3 |
| B | Et(IndH$_4$)$_2$ HfCl$_2$ | | 1.72 | | 280 | 0.5 | 50 | 127.1 | 143 | 74 | 142 | 155 | 271 | 2.1 |
| C | | Et(Ind)$_2$ ZrCl$_2$ | | 1.46 | 280 | 0.5 | 40 | 201.0 | 137 | 16 | 29 | 31 | 48 | 2.0 |
| D | | Et(IndH$_4$)$_2$ ZrCl$_2$ | | 1.45 | 280 | 0.5 | 50 | 31.0 | 138 | 7.5 | 17 | 19 | 44 | 2.5 |
| 1 | Et(Ind)$_2$ HfCl$_2$ | Et(IndH$_4$)$_2$ ZrCl$_2$ | 1.04 | 0.05 | 700 | 1.0 | 45 | 12.5 | 137 | 25 | 204 | 244 | 584 | 9.9 |
| 2 | Et(Ind)$_2$ HfCl$_2$ | Et(IndH$_4$)$_2$ ZrCl$_2$ | 1.05 | 0.04 | 280 | 1.0 | 45 | 5.5 | 138 | 16 | 132 | 169 | 541 | 10.3 |
| 3 | Et(Ind)$_2$ HfCl$_2$ | Et(IndH$_4$)$_2$ ZrCl$_2$ | 1.03 | 0.21 | 280 | 0 | 45 | 15.0 | 136 | 11 | 73 | 103 | 549 | 9.8 |
| 4 | Et(Ind)$_2$ HfCl$_2$ | Et(Ind)$_2$ ZrCl$_2$ | 1.2 | 0.2 | 380 | 0 | 80 | 47.0 | 128 | 16 | 70 | 80 | 173 | 5.1 |
| 5 | Et(Ind)$_2$ HfCl$_2$ | Et(Ind)$_2$ ZrCl$_2$ | 1.0 | 0.3 | 380 | 0 | 80 | 56.0 | 126 | 12 | 42 | 49 | 121 | 4.2 |
| 6 | Et(Ind)$_2$ HfCl$_2$ | Et(Ind)$_2$ ZrCl$_2$ | 1.0 | 0.4 | 380 | 0 | 80 | 75.0 | 125 | 8.4 | 27 | 32 | 88 | 3.8 |
| 7 | Et(IndH$_4$)$_2$ HfCL$_2$ | Et(IndH$_4$)$_2$ ZrCl$_2$ | 1.0 | 0.4 | 380 | 0 | 80 | 175.0 | 125 | 8.0 | 26 | 30 | 67 | 3.7 |

10. A catalyst system for the polymerization and copolymerization of olefins having 3–8 carbon atoms, said system comprising:

(a) at least two different metallocene catalysts which are chiral and stereo-rigid and are described by the formula:

R''(C$_5$(R')$_4$)$_2$MeQ$_p$ wherein (C$_5$(R')$_4$) is a cyclopentadienyl or substituted cyclopentadienyl ring; each R' is the same or different and is a hydrogen or hydrocarbyl radical having 1–20 carbon atoms; R'' is a structural bridge between the two (C$_5$(R')$_4$) rings imparting stereo-rigidity to said catalyst, and R'' is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal as designated in the Periodic Table of Elements; each Q is a hydrocarbyl radical having 6–20 carbon atoms or is a halogen; $0 \leq p \leq 3$; and in at least one catalyst Me is a group 4b metal and in at least one of the other catalysts Me is a group 5b or 6b metal; and (b) an organoaluminum compound selected from the group consisting of alumoxane, trimethyl aluminum, and mixtures thereof.

* * * * *